Dec. 7, 1948.    D. SCIAKY    2,455,526
WELDING APPARATUS
Filed Sept. 10, 1945    4 Sheets-Sheet 4

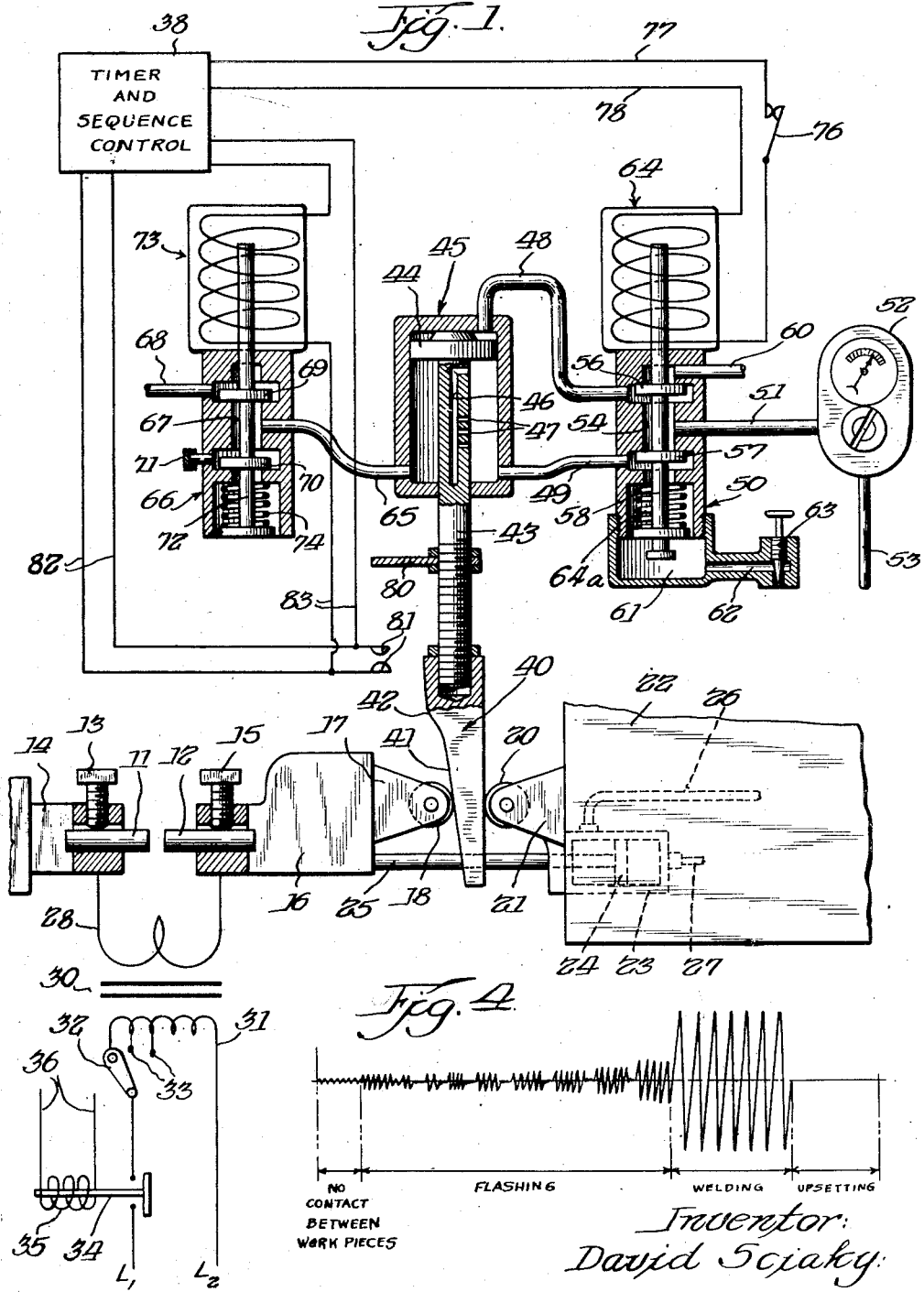

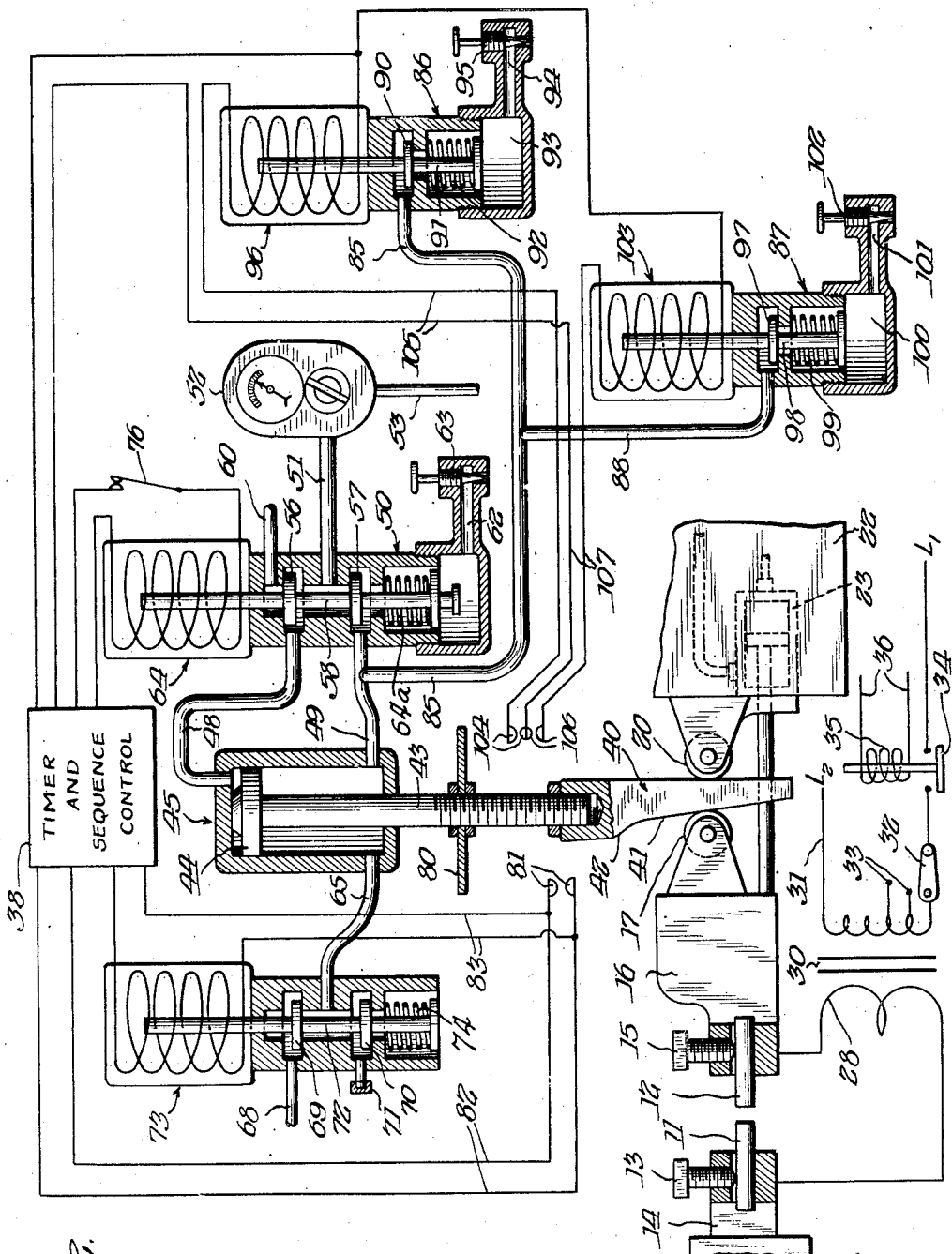

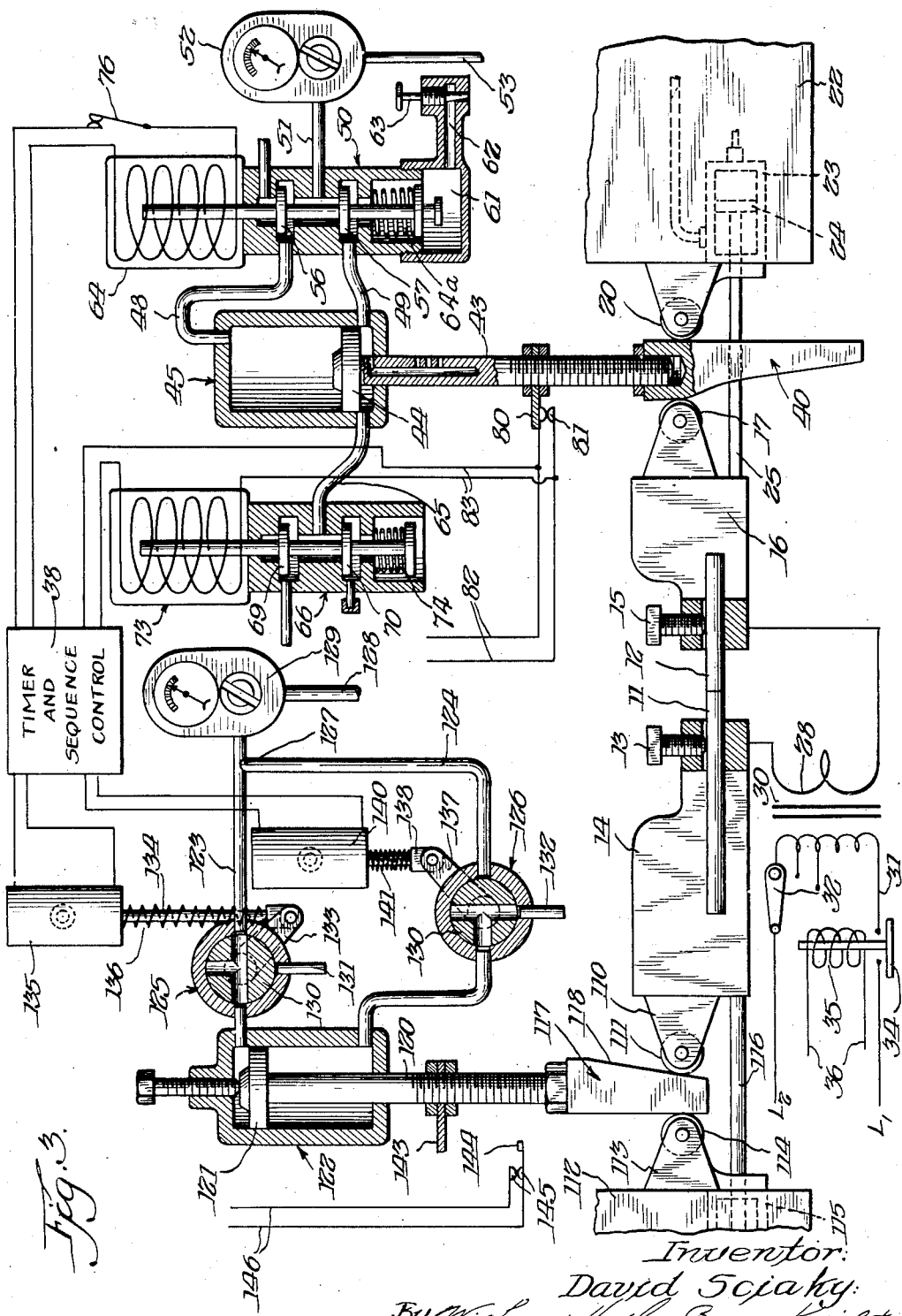

Inventor:
David Sciaky:
By: Wilkinson Huxley Byron & Knight
Attys.

Patented Dec. 7, 1948

2,455,526

UNITED STATES PATENT OFFICE 2,455,526

WELDING APPARATUS

David Sciaky, Chicago, Ill., assignor to Welding Research, Inc., Chicago, Ill., a corporation of Illinois Application September 10, 1945, Serial No. 615,269

7 Claims. (Cl. 219—4)

1

This invention relates to the operation of a flash welding machine, and has reference particularly to a means of controlling the movement of the platen or platens holding the workpieces being welded.

It is understood that the general practice of butt welding or flash welding is a commonly known, well established method of joining two pieces of metal. Numerous means for controlling the motion of the workpieces during the flashing and upsetting operations have been devised and are in common use. A great many of the processes automatically controlled however, while functioning quite satisfactorily, have proven to be expensive and in many cases extremely complex.

In general, existing flash welding machines have been controlled by one of three methods: manually operated, motor cam operated, and hydraulically operated. Operation by compressed air has been largely unsatisfactory because of the difficulty in obtaining a smooth operation. Because of the large heavy metal parts necessary to be moved during the welding operation, inertia and friction forces are of an appreciable magnitude. Also at the end of the flashing operation, it is necessary that the speed of travel of the workpieces toward each other be increased rapidly to effect the joining and upsetting operations. This imposes a large inertia reaction in addition to a huge reaction caused by the resistance to flow of the nearly solidified welded portion of the workpieces. In former systems using air as an operating medium, the motion was jerky and extreme difficulty in obtaining adequate and rapid enough upset was experienced. This was primarily because of a hunting action caused by overcoming friction with a compressible fluid and the inability to supply air at a rapid enough rate to the large cylinders required.

The present invention relates to a device or means of obtaining precise and flexible control over the motion of the workpieces being flash welded by a new and novel means which employs compressed air as the operating medium.

The above mentioned undesirable aspects of compressed air operated flash welders have been overcome basically by making reactions due to inertia and friction small as compared to reactions caused by compressed air. As the return of the movable platen or platens is controlled by compressed air permanently applied to an actuating piston, forward movement is constantly opposed by this force which is much higher than friction forces. Forward motion of the platens is controlled, not in the usual manner of supplying air at a controlled rate to the top of a piston, but

2 by releasing air at a controlled rate from the bottom of a piston, full air pressure being impressed on the top. This again greatly reduces the effect of friction forces and provides an easily controlled means of regulating the rate of travel by exhausting the air through needle valves or other means. In addition, it makes possible the almost instantaneous application of the maximum operating force by exhausting the air from the bottom of the actuating piston through a large sized port at any given point in the welding cycle.

A variation of the invention consists in introducing to one side of the cylinder a liquid instead of compressed air. The liquid is expelled by the air pressure applied to the opposite side of the piston and the rate of expulsion, which is adjusted by a needle valve or other throttling means, provides for an adequate control of the rate of travel of the platen.

An object of the invention resides in the provision of improved apparatus for flash welding which will have constant and uniform control of the workpieces from the start of the flashing operation to the completion of the upsetting operation.

Another object of the invention is to provide apparatus for butt welding which will move the workpieces together at a controlled rate to obtain the desired period of flashing in advance of welding and which will additionally control the welding time and the upsetting length.

Another object of the invention is to provide improved butt welding apparatus having cam means for moving the workpieces at a controlled rate into contact with each other, which may be adjusted to obtain proper travel for various thicknesses and sections of material, or which may be replaced with cam means having a different taper to vary the rate of travel to best suit materials having widely different characteristics.

Another object is to provide flash welding apparatus employing cam means for imparting smooth and progressive travel of the workpieces toward each other for flash welding the workpieces and which will also employ counteracting pressure means in combination with said cam means for effecting a rapid upsetting action on the welded workpieces.

With these and various other objects in view, the invention may consist of certain novel features of construction and operation as will be more fully described and particularly pointed out in the specification, drawings and claims appended hereto.

The drawings which diagrammatically show the working mechanisms of a typical flash welder illustrate an embodiment of the invention wherein like reference characters are used to designate like parts.

Figure 1 is a diagrammatic view, parts being shown in section, of flash welding apparatus constructed in accordance with the invention;

Figure 2 is a diagrammatic view, parts being shown in section, of a modified flash welding apparatus embodying the improvements of the invention;

Figure 3 is a diagrammatic view, parts being shown in section of flash welding apparatus illustrating a further modification coming within the invention;

Figure 4 is an oscillograph illustrating the flow of welding current through the workpieces for various steps in the complete welding operation.

Figure 5:
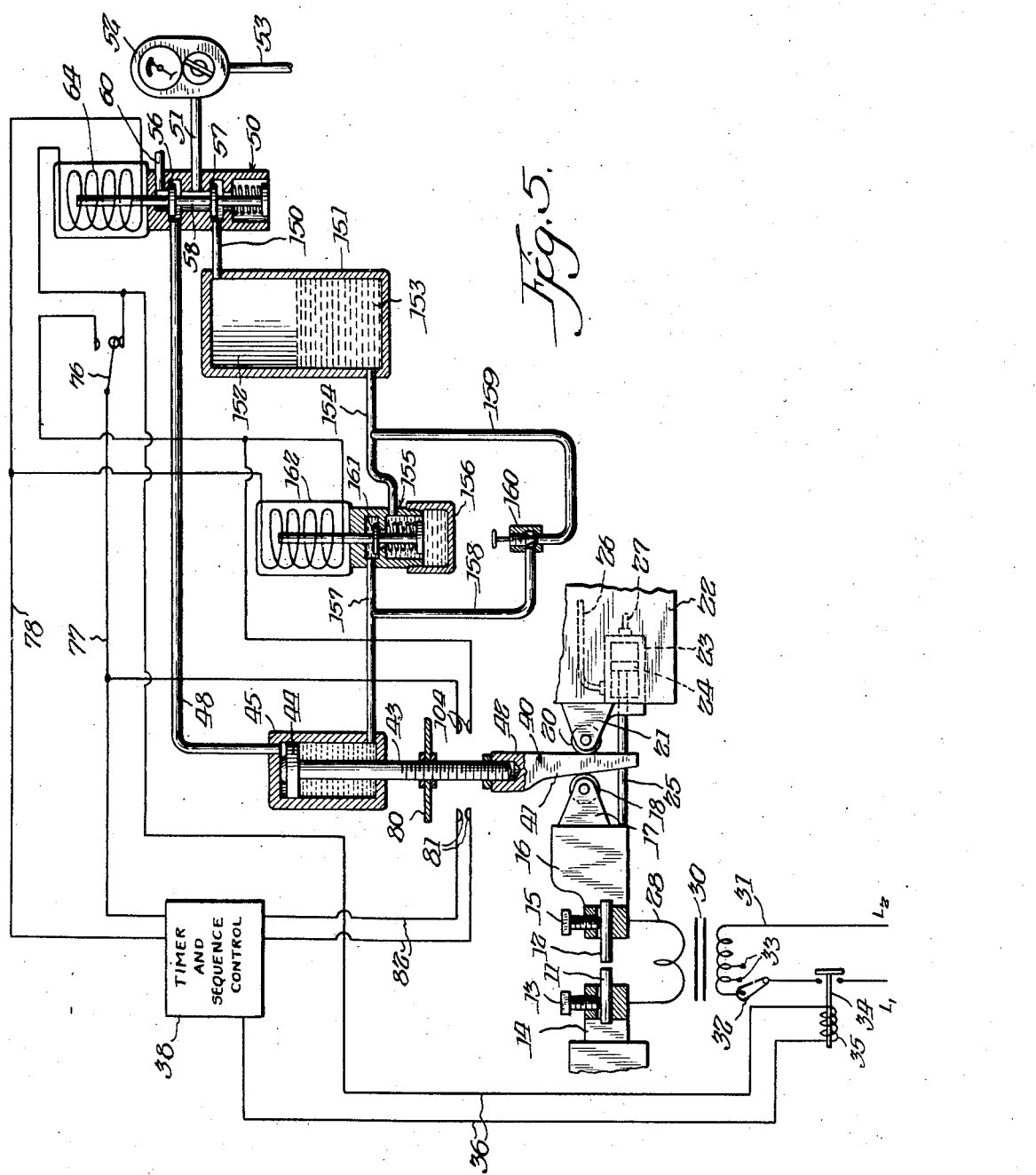
Figure 5 is a diagrammatic view, parts being shown in section, of flash welding apparatus illustrating a further modification coming within the invention.

In the embodiments of the invention illustrated in the drawings, Figures 1, 2, 3 and 5, the workpieces to be welded are identified by numerals 11 and 12. Workpiece 11 is suitably secured by means of the screw 13 to the holder 14 which is supported by the frame of the machine so as to be immovable as shown in Figures 1, 2 and 5. Workpiece 12 is securely joined by means of the screw 15 to the slide 16, suitably mounted for reciprocating movement. The movable slide 16 is provided with support 17, which journals the roller 18. A similar roller 20 is journalled by support 21, provided by the frame 22 of the machine, and which is accordingly immovable, having a fixed relation with movable slide 16. Slide 16 is urged in a direction toward the fixed member 22 of the frame by means of the pressure cylinder 23, said cylinder having the piston 24 connected by rod 25 with movable slide 16. The cylinder 23 is supplied with air pressure by means of the supply pipe 26, the same supplying said air to the left of the piston. Since the cylinder to the right of the piston is open to the atmosphere by the vent 27, the piston is accordingly urged in a direction to the right to cause the slide 16 to move toward member 22.

The holder 14 and the slide 16, having the workpieces 11 and 12 secured thereto, are electrically connected to the secondary circuit 28 of the welding transformer indicated by numeral 30. Said transformer has a primary circuit 31 suitably connected to an alternating current source by means of the leads $L_1$ and $L_2$. A tap switch 32 is provided in lead $L_1$ and by adjustment of said tap switch to electrically connect with one of the taps 33 the turn ratio of the primary circuit can be varied. The contactor 34 is also located in lead $L_1$, said contactor having an open position to maintain the circuit to the primary open when the solenoid 35 is de-energized. Said solenoid is suitably supplied with an energizing current by means of the leads 36.

The structure above described has been shown in Figures 1, 2, 3 and 5. The only exception concerns holder 14 which in Figure 3 comprises a movable slide mounted for reciprocating movement on the frame of the machine in a manner identical with the mounting of its companion slide 16. The circuit to the primary 31 in all three modifications is closed by the contactor 34 upon energization of the solenoid 35. The leads 36 of the solenoid have electrical connection with a timer 38 which controls the electrical circuits to all the various solenoids comprising elements of the apparatus. As regards solenoid 35, the timer functions to energize and deenergize the same at predetermined points in the operation of the apparatus so that electrical energy is supplied to the secondary circuit 28 to cause a welding current to flow through the workpieces for welding the same.

Referring more particularly to Figure 1, a tapered cam 40 is interposed between rollers 18 and 20. The surface of cam 40 in contact with roller 20 is straight throughout its extent, being parallel with the direction of movement of the cam. The surface 41 has a special taper which is selected for the particular workpieces to be welded. At the upper end of the taper 41 a cam portion 42 is provided. The location of this cam portion and its magnitude has likewise been selected with knowledge of the workpieces to be welded, the particular materials comprising the workpieces, their characteristics and the like. The cam 40 is suitably secured to piston rod 43, fixed to piston 44, mounted for reciprocating movement in a pressure cylinder 45. Cylinder 45 is suitably supported in proper position by the frame of the apparatus and it will be observed that reciprocation of piston 44 will impart similar movement to cam 40. In this modification piston rod 43 is provided with an air passage 46 having one or more vent passages 47.

The respective ends of cylinder 45 have connection with supply pipes 48 and 49, said pipes leading to a double-acting valve 50. Supply pipe 51 for said valve has connection with a pressure reducing unit 52 so that the pressure of the air supplied by the same from pipe 53 may be reduced to any pressure desired. Supply pipe 51 has connection with an interior passage 54 which is equipped wtih valve members 56 and 57, said valve members being joined to the actuating shaft 58. Valve 50 is provided with a vent pipe 60 having connection with passage 54 above valve member 56. An exhaust chamber 61 is provided below valve member 57, which chamber connects with vent opening 62, the size of which may be controlled by adjustment of the needle valve 63.

The actuating shaft 58 is yieldingly biased in a downward direction by coil spring 64a. Action of the coil spring on the shaft is such as to maintain valve members 56 and 57 in contact with their lower seats. A solenoid, indicated in its entirety by numeral 64, is located on top of valve 50 and by energization of said solenoid said shaft 58 is caused to move in an upward direction to thus maintain valve members 56 and 57 in contact with their upper seats.

Pressure cylinder 45 has connection with exhaust pipe 65 for venting the cylinder below the piston. Exhaust pipe 65 connects with the double-acting valve 66. The interior passage 67 in communication with said exhaust pipe leads to an atmospheric vent 68 associated with valve member 69 and to a second vent associated with valve member 70 and maintained closed by the cap 71. The vertically disposed actuating shaft 72 connects the valve members 69 and 70 and extends into the solenoid 73. The coil spring 74 is associated with the lower end of said actuating shaft and functions to maintain said shaft in a downward position, with the valve members 69 and 70 in contact with their lower seats. By energization of solenoid 73 the actuating shaft is caused to move in an upward direction to locate valve members 69 and 70 in contact with their upper seats.

As shown in Figure 1, the piston 44 and thus cam 40 has been retracted to locate the piston in the upper end of the cylinder 45 and to also retract cam 40, having its tapered end positioned between rollers 18 and 20. For retracting the piston, the solenoid 64 is deenergized, in which event spring 64a maintains the valve members against their lower seats. Solenoid 73 is also deenergized and valve members 69 and 70 are accordingly in contact with their lower seats. The air at a predetermined pressure enters the valve 50 and is admitted to pipe 49 to apply pressure under the piston 44, effecting movement upwardly to its retracted position in the upper end of the cylinder 45. When air under pressure enters pipe 49, pipe 48 is automatically connected to the vent 60.

Referring to Figure 1, the device and all component parts are shown in the rest position or the condition which would exist immediately prior to the welding operation except for the solenoid air valve 50 which is shown in energized condition.

A welding operation will now be described, with the parts positioned as shown in Figure 1, it being understood that workpieces 11 and 12 have been properly located in the electrodes provided therefor and suitably secured by the screws 13 and 15. A flash welding operation is initiated by closing the manually actuated switch 76 which controls the supply of current through conductors 77 and 78 to the solenoid 64 and energizes solenoid 35, closing contacts 34 and energizing transformer 30. Since the solenoid 64 is energized, the valve members 56 and 57 are moved upwardly and maintained in contact with their upper seats. Air pressure from pipe 51 is now supplied to pipe 48 and admitted to cylinder 45 above the piston to effect travel of the piston in a downward direction. The air under pressure below the piston cannot escape through exhaust pipe 65 for the reason that valve members 69 and 70 are maintained in contact with their lower seats, the solenoid 73 being deenergized. The air below the piston can escape, however, through pipe 49, exhaust chamber 61, and through the needle controlled vent 62. Said outlet is adjusted by needle valve 63 to an extent where said outlet is materially restricted so that piston 44 and thus cam 40 will move downwardly at a relatively slow rate. Downward movement of cam 40 produces movement of slide 16 in a direction toward the left, Figure 1, by reason of the tapering surface 41 on the side of the cam in contact with roller 18. The workpiece 12 is accordingly moved toward workpiece 11 at a controlled rate and which can be adjusted in several different ways. For example, cam 40 can be replaced by a cam having a different taper or the needle valve 63 can be adjusted to increase the rate of discharge of the air from below the piston.

Movement of the cam in a downward direction will continue at substantially the initial rate of travel until the first of the vent openings 47 in the piston rod 43 is located below cylinder 45. This action automatically increases the rate of discharge of the air below the piston to accelerate movement of cam 40 in the same direction. Before cam portion 42 comes in contact with roller 18, the adjustable arm 80 engages contacts 81, causing them to close, which energizes the solenoid coil 73 and conditions the timer 38. Valve members 69 and 70 are moved into contact with their upper seats and the exhaust pipe 65 is connected to vent 68. This unrestricted discharge of air below the piston materially accelerates cam 40, the rapid movement of the cam causing roller 18 to ride the cam portion 42. Cam portion 42 is designed to impart desired movement to slide 16, thereby effecting an upsetting operation on the workpieces 11 and 12.

At some time after solenoid 73 is energized, solenoid 35 is deenergized, the latter action being controlled by the timer 38. Contact 34 therefore opens and the supply of alternating current to the primary 31 of the welding transformer 30 is discontinued. Variation of the time involved is controlled by timer 38.

After the welded workpieces have been released, the operator opens switch 76, de-energizing solenoid 64 and solenoid 73 to thereby supply air under pressure through pipe 49 below the piston, causing said piston to move in an upward direction to retract the cam 40. Air under pressure is continuously supplied through pipe 26 to cylinder 23 to hold the roller 18 in contact with the tapered surface of cam 40 so that slide 16 automatically moves toward the right to its initial position.

It is to be emphasized that because air pressure is continuously supplied to the platen side of piston 24 in cylinder 23 a constant force is applied to movable platen 16, holding roller 18 in contact with cam surface 41. Because of this, forward motion of platen 16 during the flashing operation caused by the downward movement of cam 40 is resisted by both the friction forces and force applied by air pressure on piston 24, said air pressure being of sufficient magnitude that the friction force becomes of little consequence, thereby further insuring a smooth operation.

The action of the apparatus of Figure 1 is illustrated in the oscillograph shown in Figure 4. When solenoid 35 is first energized to close the contactor 34, the workpieces 11 and 12 are not in contact. This period in the operation of the apparatus is illustrated at the extreme left hand end of the oscillograph. Initial contact of the workpieces is represented by the period identified as "flashing." After solenoid 73 has been energized, causing the air from the bottom of piston 44 to be rapidly exhausted, the increase in the rate of travel of the cam 40 and consequently the platen 16 causes solid contact between the workpieces to take place which represents the start of the welding operation. The welding operation continues until action of the timer 38 deenergizes solenoid 35, opening contacts 34, thereby stopping the flow of current to welding transformer primary 31. When cam section 42 is inserted between the rollers 18 and 20, the rate of travel of the platen 16 is increased materially, causing the upsetting portion of the operation. When this action takes place the weld joining the workpieces 11 and 12 is in a molten or plastic condition and the added thrust given to workpiece 12 provides the desired upsetting operation on the workpieces.

Figure 2 represents a modification of the apparatus as shown in Figure 1, wherein the air passage 46 and vent 41 are omitted from the piston rod 43. Solenoid operated valves having adjustable needle-controlled vents are substituted therefor.

This structure will now be described. Pipe 85 has connection with pipe 49 at a point between cylinder 45 and the double-acting valve 50. The opposite end of pipe 85 connects with a single-acting valve 86. Additional single-acting valves 86 may be employed, one, namely 87, being illustrated in Figure 2. Said valve 87 likewise has connection with pipe 49 through the instrumentality of 85 and branch pipe 88. Valve 86 has a valve member 90 fixed to the vertical actuating shaft 91 and is yieldingly maintained against its lower seat by coil spring 92. Vent chamber 93 communicates with the vent 94 controlled by the needle valve 95. The actuating shaft 91 projects into a solenoid indicated in its entirety by 96, which upon energization causes movement of valve member 90 upwardly into contact with its upper seat. Valve 87 is similarly equipped with a valve member 97 fixed to a vertically disposed actuating shaft 98. The valve member is yieldingly held in contact with its lower seat by coil spring 99 and the vent chamber 100 communicating with vent opening 101, controlled by the adjustable needle valve 102. The actuating shaft 98 extends into the solenoid 103 and energization of the solenoid lifts the valve member 97 into contact with its upper seat.

The operation of the modified apparatus shown in Figure 2 will now be described, with the parts positioned as shown. The operator starts the welding operation by closing the manually actuated switch 76, energizing the solenoid 64, which supplies air under pressure to cylinder 45 above the piston 44 and energizes solenoid 35 in turn energizing transformer 30. The piston therefore moves downwardly with the pressure below the piston being controlled as explained in connection with the apparatus of Figure 1. Movement of the piston in a downward direction is accelerated by progressive actuation of the single-acting valves 86 and 87. At a predetermined point in the movement of cam 40 downwardly, the adjustable arm 80 will engage the contacts 104 to close said contacts and through conductors 105 the electrical circuit to solenoid 96 will be closed. The valve member 90 will move upwardly to open pipe 85 to the vent chamber 93 of said valve 86. The pressure under piston 44 is accordingly vented through vent opening 94 at a rate controlled by adjustment of needle valve 95. Continued downward movement of the adjustable arm 80 will effect closing of contacts 106 and energization of solenoid 103 through the conductors 107. In a similar manner valve member 97 will be caused to move against its upper seat to connect branch pipe 88 with the vent chamber 100 and the vent opening 101. Release of pressure under piston 44 is accordingly accelerated by actuation of the second valve 87 and other valves similar thereto can be progressively actuated to increase the rate at which the air is exhausted from cylinder 45. The piston 44 and cam 40 have movement in a downward direction and which is controlled so that the accelerating movement of the cam can be regulated, depending on the size of the workpiece, the particular metal, and composition of the same.

The flash welding apparatus shown in Figure 3, incorporates a further modification characterized by mounting the holder 14 for movement in a manner similar to slide 16. In this structure 14 and 16 therefore indicate slides mounted by the frame of the apparatus for reciprocation in a direction toward and away from each other. The taper cam 40 is employed for moving slide 16 to bring the workpieces into contact for the flashing and welding operations. A second taper cam to be presently described in detail is employed for moving slide 14 to effect an upsetting of the welded parts. The taper cam 40 is fixed to the piston rod 43 which is actuated by piston 44, located in pressure cylinder 45, all as illustrated and described in connection with the apparatus of Figure 1. The cam 40 in the apparatus of Figure 3 has a taper which differs somewhat from that of cam 40 as employed in Figures 1 and 2. Since a second cam is provided for the upsetting operation said cam 40 has a gradual taper and cam portion 42 is eliminated entirely.

Slide 14 is provided with support 110 to which is suitably journalled the roller 111. The fixed member 112 of the frame provides support 113 which journals the roller 114. The movable slide 14 is urged in a direction toward fixed member 112 of the frame by means of the pressure cylinder 115, the piston of said cylinder being connected by the piston rod 116 to said slide 14. The action of pressure cylinder 115 is similar in all respects to that of cylinder 23, the piston of which is directly connected to slide 16. A tapered cam 117 is interposed between rollers 111 and 114. The surface of said cam in contact with roller 114 is straight throughout its extent, being parallel with the direction of movement of the cam. The surface 118 has a special taper which is selected for imparting the desired movement to slide 14. Said cam 117 is suitably secured to piston rod 120 fixed to piston 121, mounted for reciprocating movement in the pressure cylinder 122. The respective ends of the pressure cylinder have connection with supply pipes 123 and 124, a two-way valve 125 being interposed in pipe 123 and a similar two-way valve 126 being interposed in pipe 124. Said pipes join at 127 and both are supplied with air under pressure from the supply pipe 128 through the reducing unit 129.

In the illustrated embodiment shown in Figure 3 the two-way valves are of the rotary type, each including a rotor 130 and having a vent pipe 131 and 132, respectively. The rotor of valve 125 is actuated by arm 133, having connection with the actuating shaft 134 which extends into the solenoid 135. The coil spring 136 on shaft 134 resiliently forces the arm 133 in a downward direction to thereby connect the upper end of the cylinder with the supply pipe 123. When the solenoid 135 is energized actuating shaft 134 is attracted and caused to move upwardly, thereby actuating arm 133 to connect the upper end of the cylinder with the vent pipe 131. The rotor 130 of the two-way valve 126 has suitably fixed thereto the arm 137 which is pivotally connected to the actuating shaft 138. Said shaft extends into solenoid 140, which effects movement of the actuating shaft in an upward direction, whereas, the coil spring 141 produces movement of said actuating shaft in a downward direction. When the solenoid 140 is energized the lower end of the pressure cylinder 122 is connected to the vent pipe 132 and upon deenergization the arm 137 moves downwardly to connect the lower end of the cylinder with supply pipe 124.

In the operation of the apparatus of Figure 3, the welding of the workpieces is accomplished by cam 40 in moving in a downward direction at the desired rate until adjustable arm 80 engages the contacts 81 to close them. When this takes place the piston 44 will have approximately reached the end of its travel in a downward direction. Closing of contacts 81 conditions timer 38 through conductor 82, energizes solenoid 140, and deenergizes solenoid 135 at the same time. Later, as determined by setting of the timer 38, solenoid 35 becomes deenergized, opening contacts 34, stopping the flow of welding current to the primary 31 of the welding transformer. This action is adjustable and takes place some time between the operation of solenoids 140 and 135 and the end of the complete welding operation. Solenoid 140 is energized, which rotates the rotor 130 of valve 126 to the position as shown, whereby the lower end of cylinder 122 is connected to vent opening 132. The pressure under the piston is thereby released and since air under pressure is supplied to above the piston the same is caused to move downwardly with considerable speed. The taper cam 117 is accordingly forced between rollers 111 and 114 which moves slide 14 to the right, effecting an upsetting operation on the welded workpieces. Movement of piston 121 in a downward direction is terminated when the adjustable arm 143 comes into engagement with switch 144 to open the normally closed contacts 145. The contacts have electrical connection with conductors 146 which lead to the timer 38 so that the timer is conditioned to energize solenoid 135, rotating the rotor 130 of valve 125 to thereby terminate the supply of air above the piston and open the space above the piston to the vent 131.

When the welded workpieces have been removed from the apparatus the parts are returned to initial position by opening the manually actuated switch 76 which deenergizes the valve 50, effecting downward movement of valve members 56 and 57 to thereby supply air under pressure through pipe 49 to below the piston. Opening of switch 76 also conditions the timer so that solenoid 140 is deenergized. This produces rotation of rotor 130 of valve 126 in a direction to connect supply pipe 124 with the bottom of cylinder 122. The pistons of both cylinders are thus caused to travel in an upward direction to retract their respective cams and the apparatus is ready for another welding operation.

Figure 5 represents a further modification of Figure 1, wherein the pressure medium controlling the downward movement of piston 44 and consequently cam 40 is a liquid instead of a gas. In this diagram all parts and actions are the same as in Figure 1 except as follows:

Outlet 150 of control valve 50 in Figure 5 is connected to a reservoir 151 containing a gaseous pressure medium in chamber 152 at the top applying pressure to a suitable liquid 153 in the bottom of said reservoir. Pipe 154 conducts the liquid from reservoir 151 to the actuating valve 155 which is shown in the deenergized condition. The liquid is prevented from escaping from this valve 155 by means of a cap 156. The outlet from the other side of valve 155 is connected to the bottom of cylinder 45 by means of pipe 157. Connected in parallel with valve 155 by means of pipes 158 and 159 is a needle valve 160 controlling the return of flow of the liquid when valve 155 is closed.

A welding operation will now be described with the parts shown as positioned in Figure 5, it being understood that workpieces 11 and 12 have been properly located in the electrodes provided therefor and suitably secured by the screws 13 and 15. Flash welding operation is initiated by closing the manually actuated switch 76 which controls the supply of current through conductors 77 and 78 to the solenoid 64. The solenoid is energized and the valve members 56 and 57 are moved upwardly and maintained in contact with their upper seats. Air pressure from pipe 51 is now supplied to pipe 48 and admitted to cylinder 45 above the piston 44 to effect travel of the piston in a downward direction. The liquid below the piston 44 can not flow through valve 155 because valve member 161 is maintained in contact with its lower seat, solenoid 162 being deenergized. The liquid below the piston can escape, however, through pipe 158, needle controlled vent 160, and pipe 159 to the reservoir 151. The air in the chamber 152 of said reservoir is at the exhaust pressure because valve member 57 is maintained against its upper seat. The flow of liquid from the bottom of cylinder 45 is adjusted by needle valve 160 to an extent where said outlet is materially restricted so that piston 44 and thus cam 40 will move downwardly at a relatively slow rate.

Movement of the cam in a downward direction will continue at substantially the initial rate of travel until adjustable arm 80 engages contacts 81 and 104 causing them to close, which energizes solenoid coil 162 and conditions the timer 38. Valve member 161 is moved into contact with its upper seat and the exhaust pipe 157 is connected directly to pipe 154 through said valve. This unrestricted discharge of liquid below the piston materially accelerates cam 40, the rapid movement of said cam causing roller 18 to ride the cam portion 42.

At some time after solenoid 162 is energized, solenoid 35 is deenergized, the latter action being controlled by timer 38. Contacts 34 therefore open and the supply of alternating current to the primary 31 of the welding transformer 30 is disconnected.

After the welded workpieces have been released the operator opens switch 76 which deenergizes solenoid 64 and maintains solenoid 162 in the energized condition through conductors 77 and 78. This causes air pressure on the top of piston 44 to be exhausted through pipes 48 and 60 and air pressure to be applied to the top chamber 152 of reservoir 151, forcing the liquid 153 through pipe 154, valve 155, and pipe 157, to the bottom of piston 44, causing cam 40 to move in an upward direction. All or any other operations are identical with those as described according to Figure 1 and it is to be understood that variation in the rate of downward motion of cam 40 during the flashing operation may be controlled by means described in Figure 1 or Figure 2.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In welding apparatus, in combination, electrodes for holding workpieces to be welded, a movable slide supporting one electrode and mounting the same for reciprocating movement toward and from the other electrode, a taper cam member adapted to reciprocate in a direction normal to the direction of movement of said slide for moving said slide, said cam member having a cam surface of characteristic contour for imparting predetermined movement to said slide, a pressure cylinder for reciprocating the cam member, and control means for said pressure cylinder including control valves for selectively admitting a pressure medium to the respective ends of said cylinder and for venting a pressure medium from at least one end of the cylinder at a controlled progressively increasing rate of discharge to thereby regulate travel of the piston toward said end.

2. In apparatus for butt welding workpieces, in combination, electrodes for holding the workpieces to be welded, a movable slide supporting one electrode and mounting the same for reciprocating movement toward and from the other electrode, a roller journalled by the slide, a second roller journalled by the frame of the apparatus, a tapering cam located between the rollers and adapted to reciprocate in a direction substantially normal to the direction of movement of said slide, a pressure cylinder for reciprocating said tapering cam, and control means for said pressure cylinder including control valves for admitting a pressure medium to one end of said cylinder and for simultaneously venting a pressure medium from the opposite end of the cylinder at a controlled progressively increasing rate of discharge to thereby regulate travel of the piston toward said end.

3. In apparatus for butt welding workpieces, in combination, electrodes for holding the workpieces to be welded, a movable slide supporting one electrode and mounting the same for reciprocating movement toward and from the other electrode, means for moving said slide including a cam member having a cam surface, a pressure cylinder for moving the cam member, control means for said pressure cylinder including a solenoid actuated control valve for selectively admitting a pressure medium to the respective ends of said cylinder, at least one other solenoid actuated valve in combination with said first mentioned valve for venting a pressure medium from at least one end of the cylinder at a controlled rate and simultaneously with the admission of the pressure medium to the opposite side of the piston to thereby regulate travel of the piston toward said end, and electric means for controlling the energization and deenergization of the solenoids of said valves.

4. In apparatus for butt welding workpieces, in combination, electrodes for holding the workpieces to be welded, a movable slide supporting one electrode and mounting the same for reciprocating movement toward and from the other electrode, means for moving the slide including a cam member having a camming surface in contact with the slide, a pressure cylinder having a double-acting piston for moving the cam member, means supplying a pressure medium to one side of the piston to cause movement of the cam member in a direction to bring the workpieces into contact for welding, means for venting a pressure medium from the opposite side of the piston at a progressively increasing rate of discharge and simultaneously with the admission of the pressure medium to the first mentioned side to thereby regulate speed of travel of said piston and thus the cam member, and means controlling the flow of welding current to said electrodes.

5. In apparatus for butt welding workpieces, in combination, electrodes for holding the workpieces to be welded, a movable slide supporting one electrode and mounting the same for reciprocating movement toward and from the other electrode, means for moving the slide including a cam member having a camming surface in contact with the slide, a pressure cylinder having a double-acting piston, said cam member having securement to the piston so that reciprocating movement of the same is imparted to the cam member, means supplying fluid pressure to the cylinder for applying a working force to one side of the piston to effect movement of the cam member in a certain direction for contacting the workpieces for welding, other means for applying a counter-acting force of less magnitude to the opposite side of the piston whereby its movement for contacting the workpieces takes place at a controlled rate according to the magnitude of the counter-acting force, a plurality of solenoid operated valves for progressively reducing said counter-acting force as the cam member moves in said certain direction, and electric means respectively for controlling the operation of said valves, said electric means being actuated selectively by movement of the piston in said certain direction.

6. In apparatus for butt welding workpieces, in combination, electrodes for holding the workpieces to be welded, a movable slide supporting one electrode and mounting the same for reciprocating movement toward and from the other electrode, a roller journalled by said slide, means for moving said slide including a tapering cam contacting said roller and having reciprocating movement in a direction substantially normal to the direction of movement of the slide, a pressure cylinder having a double-acting piston for moving said tapering cam, and control means for said pressure cylinder including a control valve for selectively admitting a pressure medium to the respective ends of said cylinder, other control means for venting the pressure medium from one end of the cylinder at a controlled rate to thereby regulate travel of the piston toward said end for welding purposes, said other control means comprising a plurality of solenoid operated needle valves, and electric means for each said needle valve actuated selectively by movement of the piston toward said end for controlling operation of said valves.

7. In apparatus for butt welding workpieces, in combination, electrodes for holding the workpieces to be welded, a movable slide supporting one electrode and mounting the same for reciprocating movement toward and from the other electrode, a roller journalled by said slide, means for moving said slide including a tapering cam contacting said roller and having reciprocating movement in a direction substantially normal to the direction of movement of the slide, a pressure cylinder having a double-acting piston for moving said tapering cam, control means for said pressure cylinder including a double-acting valve for selectively admitting a pressure medium to the respective ends of the cylinder, said double-acting valve having adjustable means for regulating the discharge from one end of the cylinder as pressure is admitted to the opposite end, whereby to regulate travel of the piston toward said one end for welding purposes, a second valve for also controlling the discharge of the pressure medium from said one end of the cylinder, said last mentioned valve having operation in one direction to close said one end of the cylinder and having operation in the other direction to open said one end for unrestricted venting, and solenoid means respectively for effecting actuation of said valves.

DAVID SCIAKY.

REFERENCES CITED

The following references are of record in the file of this patent:

UNITED STATES PATENTS

| Number | Name | Date |
|---|---|---|
| 1,434,285 | Gale | Oct. 31, 1922 |
| 1,957,759 | Coates et al. | May 8, 1934 |
| 2,002,007 | Hanson | May 21, 1935 |